United States Patent
Tiwari et al.

(10) Patent No.: US 12,120,625 B2
(45) Date of Patent: *Oct. 15, 2024

(54) METHOD AND UE FOR HANDLING MOBILITY PROCEDURE FOR UE

(71) Applicant: Samsung Electronics Co., Ltd., Suwon-si (KR)

(72) Inventors: Kundan Tiwari, Bangalore (IN); Rajavelsamy Rajadurai, Bangalore (IN); Anikethan Ramakrishna Vijaya Kumar, Bangalore (IN); Lalith Kumar, Bangalore (IN); Narendranath Durga Tangudu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,205

(22) Filed: Mar. 10, 2023

(65) Prior Publication Data

US 2023/0217401 A1 Jul. 6, 2023

Related U.S. Application Data

(63) Continuation of application No. 17/035,496, filed on Sep. 28, 2020, now Pat. No. 11,611,947.

(30) Foreign Application Priority Data

Sep. 30, 2019 (IN) .............................. 201941039545

(51) Int. Cl.
H04W 60/00 (2009.01)
H04W 8/02 (2009.01)
(Continued)

(52) U.S. Cl.
CPC ........... *H04W 60/005* (2013.01); *H04W 8/02* (2013.01); *H04W 48/18* (2013.01); *H04W 60/06* (2013.01)

(58) Field of Classification Search
CPC ..... H04W 60/005; H04W 8/02; H04W 48/18; H04W 60/06; H04W 8/183; H04W 8/20; H04W 8/24; H04W 60/00; H04W 84/105
See application file for complete search history.

(56) References Cited

U.S. PATENT DOCUMENTS 11,611,947 B2 * 3/2023 Tiwari ................. H04W 48/18
2004/0264414 A1 12/2004 Dorenbosch
(Continued)

FOREIGN PATENT DOCUMENTS

WO 2018/111030 A1 6/2018

OTHER PUBLICATIONS

3GPP TR 21.905 V16.0.0 (Jun. 2019), Technical Report, 3rd Generation Partnership Project; Technical Specification Group Services and System Aspects; Vocabulary for 3GPP Specifications (Release 16), Jun. 2019, 67 pages.
(Continued)

*Primary Examiner* — Marisol Figueroa

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE).
Embodiments herein disclose a method performed by a terminal in a mobile communication system. The method includes performing a registration procedure on a first standalone non-public network (SNPN), selecting a second SNPN based on a predetermined condition, and transmitting, to a network entity, a registration request message on the
(Continued)

second SNPN for an initial registration, in case that the second SNPN differs from the first SNPN.

12 Claims, 6 Drawing Sheets

(51) Int. Cl.
 *H04W 48/18* (2009.01)
 *H04W 60/06* (2009.01)

(56) References Cited

U.S. PATENT DOCUMENTS

| | | |
|---|---|---|
| 2019/0246282 A1 | 8/2019 | Li et al. |
| 2020/0120570 A1 | 4/2020 | Youn et al. |
| 2021/0051577 A1 | 2/2021 | Won |
| 2022/0061023 A1 | 2/2022 | Xu et al. |
| 2022/0167260 A1 | 5/2022 | Chun |

OTHER PUBLICATIONS

3GPP TS 23.122 V16.3.0 (Sep. 2019), Technical Specification, 3rd Generation Partnership Project; Technical Specification Group Core Network and Terminals; Non-Access-Stratum (NAS) functions related to Mobile Station (MS) in idle mode (Release 16), Sep. 2019, 74 pages.
3GPP TS 23.501 V16.2.0 (Sep. 2019), Technical Specification, 3rd Generation Partnership Project; Technical Specification Group Services and System Aspects; System Architecture for the 5G System (5GS); Stage 2 (Release 16), Sep. 2019, 396 pages.
3GPP TS 24.501 V16.2.0 (Sep. 2019), Technical Specification, 3rd Generation Partnership Project; Technical Specification Group Core Network and Terminals; Non-Access-Stratum (NAS) protocol for 5G System (5GS); Stage 3; (Release 16), Sep. 2019, 610 pages.
3GPP TS 31.101 V15.2.0 (Sep. 2019), Technical Specification, 3rd Generation Partnership Project; Technical Specification Group Core Network and Terminals; UICC-terminal interface; Physical and logical characteristics (Release 15), Sep. 2019, 36 pages.
3GPP TS 31.102 V16.1.0 (Sep. 2019), Technical Specification, 3rd Generation Partnership Project; Technical Specification Group Core Network and Terminals; Characteristics of the Universal Subscriber Identity Module (USIM) application (Release 16), Sep. 2019, 318 pages.
Ericsson et al., "Corrections for SNPN selection," C1-194767, 3GPP TSG-CT WG1 Meeting #119, Wroclaw, Poland Aug. 26-30, 2019, 9 pages.
Nokia et al., "SNPN selection," R2-1909306, 3GPP TSG-RAN WG2 Meeting #107, Prague, Czech Republic, Aug. 26-30, 2019, 2 pages.
International Search Report and Written Opinion of the International Searching Authority in connection with International Application No. PCT/KR2020/013136 issued Dec. 30, 2020, 6 pages.
Office Action dated Sep. 9, 2021 in connection with India Patent Application No. 201941039545, 6 pages.
"3rd Generation Partnership Project; Technical Specification Group Services and System Aspects; System Architecture for the 5G System; Stage 2 (Release 16)", 3GPP TS 23.501 V16.1.0 (Sep. 2019), 368 pages.
Supplementary European Search Report dated Aug. 23, 2022, in connection with European Application No. 20872876.6, 12 pages.
Ericsson, et al., "SNPN selection—update of existing subclauses," C1-192730, 3GPP TSG CT WG1 Meeting #116, Xi'an, P.R. of China, Apr. 8-12, 2019, 14 pages.
Ericsson, et al., "SNPN selection—new subclauses," C1-192766, 3GPP TSG CT WG1 Meeting #116, Xi'an, P.R. of China, Apr. 8-12, 2019, 9 pages.
Nokia, et al., "Lists of forbidden networks in an SNPN," C1-194782, 3GPP TSG-CT WG1 Meeting #19, Wroclaw (Poland), Aug. 26-30, 2019, 3 pages.
3GPP TS 23.122 V16.2.0, 3rd Generation Partnership Project; Technical Specification Group Core Network and Terminals; Non-Access-Stratum (NAS) functions related to Mobile Station (MS) in idle mode (Release 16), Jun. 2019, pp. 42-45.

\* cited by examiner

METHOD AND UE FOR HANDLING MOBILITY PROCEDURE FOR UE

CROSS-REFERENCE TO RELATED APPLICATIONS

This application is a continuation of U.S. patent application Ser. No. 17/035,496 filed on Sep. 28, 2020, which is based on and claims priority under 35 U.S.C. § 119 to Indian Provisional Patent Application No. 201941039545 filed on Sep. 30, 2019, and Indian Patent Application No. 201941039545 filed on Jun. 22, 2020, in the Indian Intellectual Property Office, the disclosures of which are herein incorporated by reference in their entirety.

BACKGROUND

1. Field

The present disclosure relates to wireless communication, and more particularly to method and user equipment (UE) for handling mobility procedure in a standalone non-public networks (SNPN). The present application is based on, and claims priority from an Indian Application Number 201941039545 filed on 30 Sep. 2019, the disclosure of which is hereby incorporated by reference herein.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Wireless communication technology has grown heaps and bounds in recent times and also penetrated every sector of technology. One of the latest advancements in the domain is non-public networks or stand-alone non-public networks (SNPN) which are intended for sole use of a private entity such as an enterprise. The SNPN is self-contained and the private entity which owns the SNPN is responsible for radio access network (RAN) and core elements, with no interaction with a mobile service provider.

In the SNPN an unauthorized user equipment (UE) which is not associated with the private entity may not attempt to access the SNPN. Therefore, resources of the SNPN limited to the UEs of the private entity only. However, according to the current 3GPP TS 23.122 and 23.501, the UE can be configured with a list of subscriber data related to the SNPN. Each subscriber data consists of a subscriber identifier in the form of a subscription permanent identifier (SUPI) containing a network-specific identifier, credentials and an SNPN identity. A user can select a SNPN subscriber data i.e., an SNPN identity.

Consider a scenario, where the UE is registered to a first SNPN of an enterprise and the UE selects a second SNPN of the enterprise due to mobility or user preference. Conventionally, the UE performs a registration update procedure with the second SNPN. The first SNPN and the second SNPN are independent networks and hence, the first SNPN does not share a UE context with the second SNPN resulting in a failure of the registration update procedure with the second SNPN. In the enterprise comprising a plurality of UEs, multiple failures of the registration update procedure results in wastage of resources and needs to be addressed.

Thus, it is desired to address the above-mentioned disadvantages or other shortcomings or at least provide a useful alternative.

SUMMARY

The principal object of the embodiments herein is to provide a method and user equipment (UE) for handling mobility procedure in standalone non-public networks (SNPN).

Another object of the embodiments herein is to determine a selection of a second SNPN due to mobility of the UE when the UE is registered with a first standalone non-public network (SNPN).

Another object of the embodiments herein is to reset a registration attempt counter on selection of the second SNPN.

Another object of the embodiments herein is to initiate the registration procedure by performing an initial registration to the second SNPN.

Accordingly, the embodiments herein disclose a method performed by a terminal in a mobile communication system. The method includes performing a registration procedure on a first standalone non-public network (SNPN); selecting a second SNPN based on a predetermined condition; and transmitting, to a network entity, a registration request message on the second SNPN for an initial registration, in case that the second SNPN differs from the first SNPN.

Accordingly, the embodiments herein disclose a terminal in a mobile communication system. The terminal includes a transceiver; and a controller configured to: perform a registration procedure on a first standalone non-public network (SNPN), select a second SNPN based on a predetermined condition, and transmit, to a network entity via the transceiver, a registration request message on the second SNPN for an initial registration, in case that the second SNPN differs from the first SNPN.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which.

DETAILED DESCRIPTION

Figure 1:
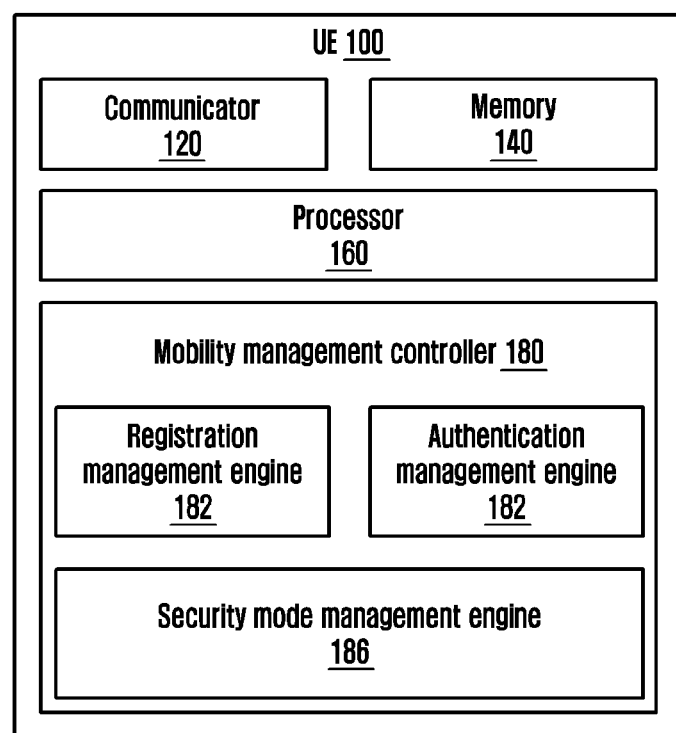
FIG. 1 is a block diagram of user equipment (UE) for handling mobility procedure for a user equipment (UE) in standalone non-public networks (SNPN) according to the embodiments as disclosed herein.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method for handling mobility procedure for user equipment (UE) (100) in standalone non-public networks (SNPN). The method includes determining, by the UE (100), a selection of a second SNPN due to mobility of the UE (100). The UE (100) is registered with a first standalone non-public networks (SNPN). Further, the method includes resetting, by the UE (100), a registration attempt counter on selection of the second SNPN; and initiating, by the UE (100), the registration procedure by performing an initial registration to the second SNPN.

Referring now to the drawings and more particularly to FIGS. 1 through 3B, where similar reference characters denote corresponding features consistently throughout the figure, these are shown preferred embodiments.

FIG. 1 is a block diagram of user equipment (UE) (100) for handling mobility procedure for user equipment (UE) (100) in standalone non-public networks (SNPN) according to the embodiments as disclosed herein.

Referring to the FIG. 1, the UE (100) can be, for example, a mobile phone, a smart phone, Personal Digital Assistant (PDA), a tablet, a wearable device, or the like. In an embodiment, the UE (100) includes a communicator (120), a memory (140), a processor (160) and a mobility management controller (180).

In one embodiment, the communicator (120) is configured to send a registration request message to the second SNPN. The registration request message is sent to the second SNPN in a security command complete message.

The memory (140) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (140) may, in some examples, be considered a non-transitory storage medium. The term "non-transitory" may indicate that the storage medium is not embodied in a carrier wave or a propagated signal. However, the term "non-transitory" should not be interpreted that the memory (140) is non-movable. In some examples, the memory (140) is configured to store larger amounts of information than the memory. In certain examples, a non-transitory storage medium may store data that can, over time, change (e.g., in Random Access Memory (RAM) or cache).

The processor (160) is configured to execute various instructions stored in the memory (140).

The mobility management controller (180) includes a registration management engine (182), an authentication management engine (184) and a security mode management engine (186).

In one embodiment, the registration management engine (182) is configured to determine a selection of a second SNPN due to mobility of the UE (100) or the user selection of the second SNPN (e.g., as a result of manual SNPN selection procedure). Further, the registration management engine (182) is configured to perform a de-registration procedure to the first SNPN and initiate the transmission of a registration request message to the second SNPN and initiate the registration procedure by performing the initial registration to the second SNPN. The registration request message to the second SNPN is sent in a security command complete message. The registration request message is ciphered using a 5G NAS security context established due to the execution of the security mode procedure on receiving a security mode command message. The registration request message comprises cleartext IE(s) and a non-cleartext IE(s). The cleartext IEs are information elements that can be sent without confidentiality protection in initial NAS messages. The non-cleartext IEs are information elements that are not cleartext IEs.

When the initial NAS message is a REGISTRATION REQUEST message, then the cleartext IEs are one of: extended protocol discriminator; security header type; spare half octet; registration request message identity; 5GS registration type; ngKSI; 5GS mobile identity; UE security capability; additional GUTI; UE status; and EPS NAS message container.

The UE (100) is already registered with the first standalone non-public networks (SNPN) and may be configured with multiple subscriptions for a plurality of the standalone non-public networks (SNPN). The SNPN networks are independent networks and may not communicate with each other. The selection of the second SNPN may be necessitated due to user selection or because the UE (100) may have lost coverage of the first SNPN to which the UE (100) is registered. The second SNPN is selected by one of: automatic SNPN selection mode procedure and manual SNPN mode selection procedure. Further, the registration management engine (182) is configured to reset a registration attempt counter on selection of the second SNPN. The registration request message comprises a subscription concealed identifier (SUCI) and cleartext IE (s), wherein the SUCI is determined from subscription permanent identifier (SUPI) of the second SNPN available at the UE (100).

In one embodiment, the authentication management engine (184) is configured to determine initiation of an authentication procedure by the second SNPN and determine a completion of the authentication procedure with the second SNPN.

In one embodiment, the security mode management engine (186) is configured to initiate a security mode command procedure with the second SNPN and determine a completion of the security mode command procedure with the second SNPN.

Although the FIG. 1 shows the hardware elements of the UE (100) but it is to be understood that other embodiments are not limited thereon. In other embodiments, the UE (100) may include less or more number of elements. Further, the labels or names of the elements are used only for illustrative purpose and does not limit the scope of the disclosure. One or more components can be combined together to perform same or substantially similar function.

Figure 2:
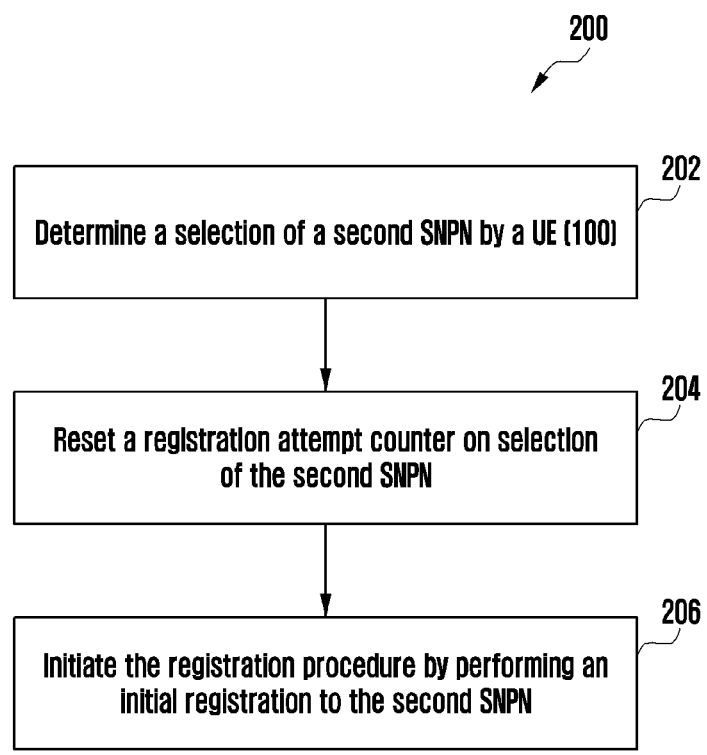
FIG. 2 is a flow chart illustrating a method for handling the mobility procedure for the UE in the standalone non-public networks (SNPN) according to the embodiments as disclosed herein.

FIG. 2 is a flow chart illustrating a method for handling the mobility procedure for the UE (100) in the standalone non-public networks (SNPN) according to the embodiments as disclosed herein.

Referring to the FIG. 2, at step 202, the UE (100) determines the selection of the second SNPN due to mobility of the UE (100) or user selection of a second SNPN using the manual SNPN selection mode procedure. For example, in the UE (100) as illustrated in the FIG. 1, the mobility management controller (180) can be configured to determine the selection of the second SNPN due to mobility of the UE (100).

At step 204, the UE (100) resets the registration attempt counter on selection of the second SNPN. For example, in the UE (100) as illustrated in the FIG. 1, the mobility management controller (180) can be configured to reset the registration attempt counter on selection of the second SNPN.

At step 206, the UE (100) initiates the registration procedure by performing the initial registration to the second SNPN. For example, in the UE (100) as illustrated in the FIG. 1, the mobility management controller (180) can be configured to initiate the registration procedure by performing the initial registration to the second SNPN.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 3A:
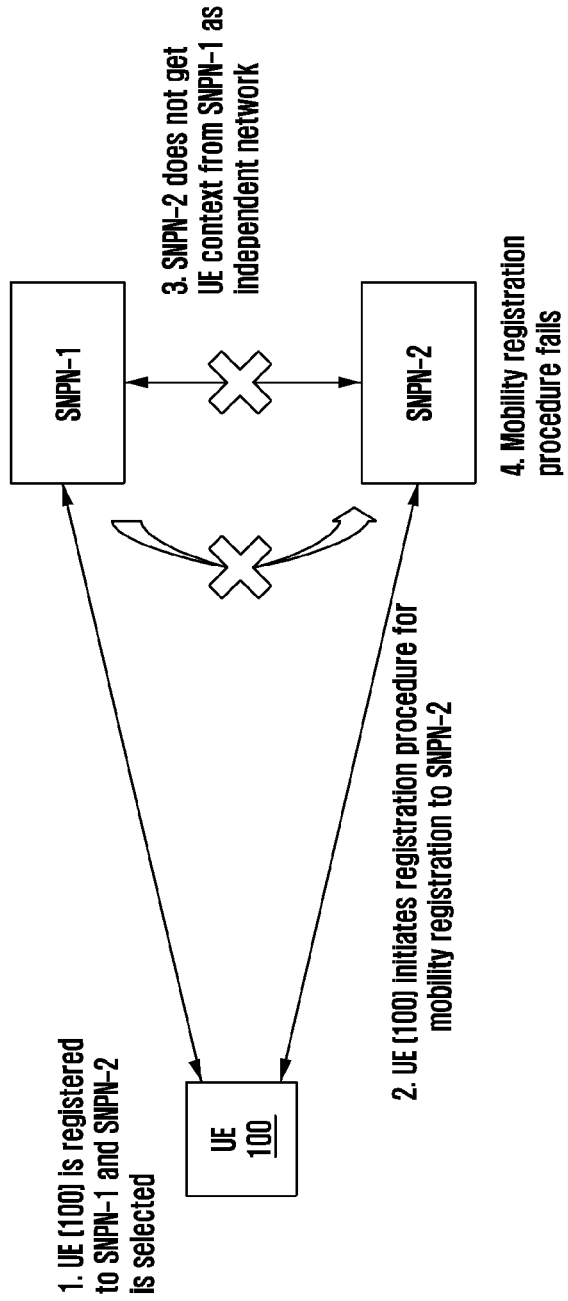
FIG. 3A illustrates a scenario of handling the mobility procedure for the UE in the standalone non-public networks (SNPN)

FIG. 3A illustrates a scenario of handling the mobility procedure for the UE (100) in the standalone non-public networks (SNPN).

Referring to the FIG. 3A, at step 1, the UE (100) is registered to the SNPN-1 and the SNPN-2 is selected due to for example the mobility of the UE (100). At step 2, the UE (100) initiates a registration procedure for mobility registration to the SNPN-2. The SNPN-2 may not get UE context from the SNPN-1 as the SNPN-1 and the SNPN-2 are independent networks (as shown in the FIG. 3A). Therefore, at step 4, the mobility registration procedure fails as an AMF of the SNPN-2 may not fetch the context from the AMF of the SNPN-1. The mobility registration procedure to the SNPN-2 may always fail which may create unnecessary signaling in the SNPN-1 and also delay in attaching to the network and therefore delay in providing services to user.

According to 3GPP TS 31.1.02 and 24.501, a universal subscriber identity module (USIM) can have two subscription permanent identifier (SUPI) one with SUPI type international mobile subscriber identity (IMSI) and other with SUPI type network specific identifier (NSI) in a USIM profile. The UE (100) can register to a network by using one type of the SUPI. The UE (100) knows that the USIM has two SUPIs however the AMF does not know that the USIM has two SUPIs. The problem also arises due to lack of clarity as to how the AMF retrieves the second SUPI.

According to 3GPP TS 23.122 the UE (100) supports the SNPN network and the SNPN related configuration (an SNPN identity, user identity (SUPI), credentials and UAC parameters) which is stored in the ME. The UE (100) have the USIM and the operator configures the ME or the USIM to calculate the subscription concealed identifier (SUCI) from the SUPI of the SNPN configuration in the USIM. However, the method of calculation of the SUPI which needs to be followed by the UE (100) is not described.

According to the 3GPP TS 24.501, the UE (100) stores the parameters (network slice selection assistance information (NSSAI) inclusion mode(s); MPS indicator; MCS indicator; operator-defined access category definitions; and network-assigned UE radio capability IDs.) in the non-volatile memory. These parameters may be re-used during the subsequent NAS procedure or when the UE (100) is switched off and switched on and the USIM contains the same SUPI. However, it is not clear whether these parameters are used or not when a NAS procedure is rejected for cause values (#3 (illegal UE (100)); #6 (illegal ME), #7 (5GS services not allowed). #11 (PLMN not allowed). Tracking area not allowed 13 (roaming not allowed in this tracking area), #73 (serving network not authorized), #74 (temporarily not authorized for this SNPN), #75 (permanently not authorized for this SNPN).

Figure 3B:
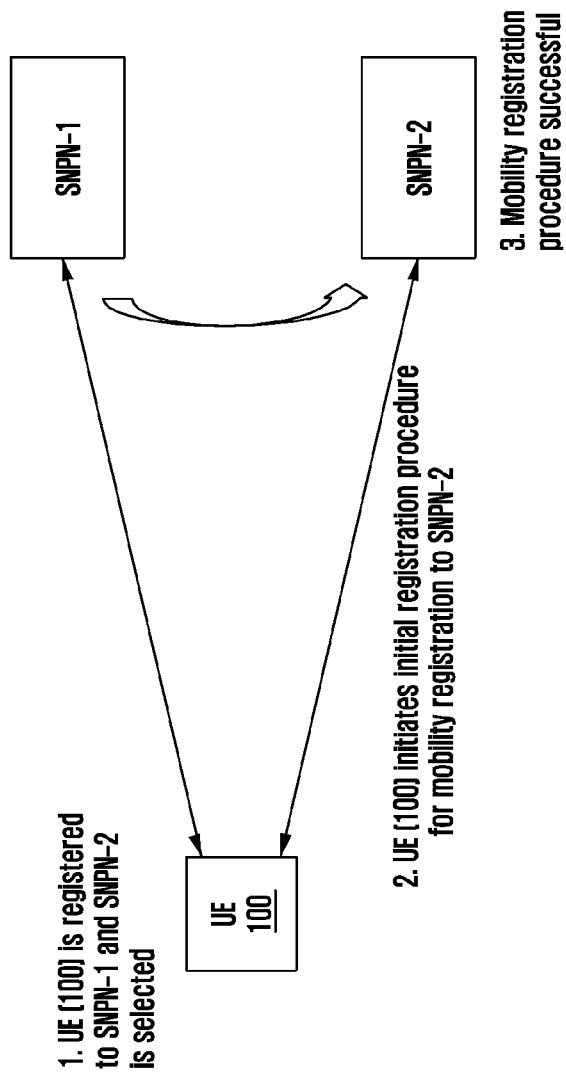
FIG. 3B illustrates a scenario of handling the mobility procedure for the UE in the standalone non-public networks (SNPN) according to the embodiments as disclosed herein.

FIG. 3B illustrates a scenario of handling the mobility procedure for the UE (100) in the standalone non-public networks (SNPN) according to the embodiments as disclosed herein.

Referring to the FIG. 3B, in conjunction with the FIG. 3A, the UE (100) is registered to the SNPN-1 and the SNPN-2 is selected due to for example the mobility of the UE (100). At step 2, the UE (100) initiates the initial registration procedure to the SNPN-2 instead of the registration update procedure to the SNPN-2. Therefore, at step 3, the mobility registration of the UE (100) with the SNPN-2 is successful.

The detailed steps are described with respect to mobile equipment (ME) below. The UE (100) has a universal subscriber identity module (USIM) and the operator configures the ME or the USIM.

0. The ME is configured with a "list of subscriber data" containing at least two entries. Each entry of the "list of subscriber data" includes:
   a) a subscriber identifier in the form of a SUPI containing a network-specific identifier;
   b) credentials;
   c) an SNPN identity; and
   d) optionally, the unified access control configuration indicating for which access identities (as described in 3GPP TS 24.501) the ME is configured in the SNPN.
1. The ME is registered to an SNPN corresponding to the first SNPN identity present in the list of subscriber data.
2. A second SNPN identity is selected either because of the automatic SNPN selection mode procedure or the manual SNPN mode selection procedure.
3. The ME may perform de-registration procedure on the first SNPN.
4. The ME stores the 5GMM context (including the security contexts (e.g., 5G NAS security context) of the first SNPN.
5. The ME calculates a SUCI from the SUPI of the second SNPN. The ME does not use the 5G NAS security contexts of the first SNPN in the NAS procedure of the second SNPN. The ME initiates initial registration procedure to the second SNPN. The UE (100) includes the SUCI and cleartext IE(s) only in the registration request message.
6. The network may initiate authentication procedure and security mode command procedure.
7. The UE (100) sends registration request message containing non-cleartext IE(s) and non-cleartext IE(s) in the security command complete message.

In one embodiment, the UE (100) may start a timer in step 2 and after the timer expires the UE (100) deletes the 5GMM context.

In another embodiment, the problem associated with the AMF not knowing that the USIM has two SUPIs and also due to lack of clarity as to how the AMF retrieves the second SUPI is addressed as follows.

0. The USIM is activated in the UE (100). The USIM has two SUPIs of SUPI type IMSI and SUPI type NSI.
1. The UE (100) is registered to the wireless communication network using a first SUPI of first SUPI type. In one example, the UE (100) indicates to the network that the UE has more than one SUPI type in the USIM in a NAS procedure (e.g., during registration procedure). In one example, the UE (100) sends total number of SUPIs or SUPI types of the SUPIs stored in the USIM.
2. The AMF determines to fetch a SUPI other than the first SUPI from a unified data management (UDM). The AMF sends a first message containing the first SUPI indicating the UDM to send the second SUPI. In one example, the AMF includes a second SUPI type in the first message for which the AMF wants to fetch the associated SUPI. In one example, the AMF sends the first message to UDM via AUSF. In one example, the AMF determines to fetch a second SUPI if the UE indicates that the USIM has more than one SUPI or sends list of SUPI types of SUPI stored in the USIM.
3. When the UDM receives the first message the UDM sends the second SUPI associated with the first SUPI to the AMF in a second message. In one example, if the UDM receives the first message via AUSF then the UDM sends the message containing the second SUPI via the AUSF. In one example, if the first message contains a second SUPI type then the UDM sends a second SUPI corresponding to the second SUPI type and associated with the first SUPI. In one example, the UDM sends all the SUPIs other than the first SUPI.

In another embodiment, the issue of the method of calculation of the SUPI which needs to be followed by the UE (100) is described below:
1. The UE (100) has a SNPN subscription stored in the ME memory. The SNPN subscription consists of a SNPN identity, a SUPI, a credential and a UAC configuration. In one example, the SUPI type of SUPI is IMSI or NSI.
2. The UE (100) requires sending a SUCI corresponding to the SUPI to the network. The ME sends a command containing the SUPI to the USIM and the command indicating to compute the SUPI to the SUCI. In one example, the ME sends the command if service no 125 may only be taken into account if service no 124 is declared "available." If service no 124 and service no 125 are declared "available," the "SUCI calculation is to be performed by the USIM." In one example, the command also indicates the SUPI type of the SUPI. In one example, the command is GET IDENTITY command sent from the ME to the USIM as defined in 3GPP TS 31.102. In one example, GET IDENTITY command is defined as below in table 1. Table 1 illustrates command parameters and data.

TABLE 1

| Code | Value |
|---|---|
| CLA | As specified in TS 31.101 |
| INS | "78" |
| P1 | "00" |
| P2 | Identity context, see Table 2 below |
| Lc | Length of subsequent data field or not present, see below |
| Data | See below |
| Le | "'00," or maximum length of data expected in response |

Parameter P2 specifies the identity context as follows: The one value of the parameter P2 identifies that the data field contains SUPI which needs to be converted to SUCI. Table 2 illustrates coding of the reference control P2.

TABLE 2

| b8 | b7 | b6 | b5 | b4 | b3 | b2 | B1 | Meaning |
|---|---|---|---|---|---|---|---|---|
| — | X | X | X | X | X | X | X | Identity context |
| — | 0 | 0 | 0 | 0 | 0 | 0 | 1 | SUCI |

All other coding are RFU. Table 3 illustrates command parameters/data.

TABLE 3

| Byte (s) | Description |
|---|---|
| 1 to Le | SUPI TLV data object |

Table 4 illustrates response parameters/data.

TABLE 4

| Byte (s) | Description |
|---|---|
| 1 to Le | SUCI TLV data object |

Table. 5 illustrates subscription concealed identifier TLV data object. The length is coded according to ISO/IEC 8825-1.

TABLE 5

| Description | Value | M/O/C | Length |
|---|---|---|---|
| SUCI TLV data object tag | "A1" | M | 1 |
| Length | X | M | Note |
| SUCI value | — | M | X |

3. Upon receiving the command, the USIM computes the SUPI to a SUCI and sends the SUCI to the ME.
4. The ME sends the SUCI to the network in a NAS procedure (e.g., registration request message to register to the network when the UE does not have a valid temporary identifier).

In another embodiment, the issue of the AMF not knowing whether the USIM has two SUPIs and how to retrieve the second SUPI, in case the AMF is aware about the two SUPIs of the USIM is addressed as below:
0. A USIM is activated in the UE (100). The USIM has two SUPIs of SUPI type IMSI and SUPI type NSI.
1. The UE (100) is registered to the network using a first SUPI of first SUPI type. In one example, the UE (100) indicates to the network that the UE (100) has more than one SUPI type in the USIM in a NAS procedure (e.g., during registration procedure). In one example, the UE (100) sends total number of SUPIs or SUPI types of the SUPIs stored in the USIM.
2. The AMF determines to fetch a SUPI other than the first SUPI from the UDM. The AMF sends a first NAS message (e.g., IDENTITY REQUEST (IE=SUPI other than first SUPI)) requesting the UE (100) to send SUPI(s) other than the first SUPI.
3. Upon receiving the first NAS message, the UE (100) sends a second NAS message (e.g., IDENTITY RESPONSE message) listing all other SUPI(s). In one example, the SUPI without concealed as SUCI. In one example, the SUPI is sent as concealed i.e. in SUCI format.
4. Upon receiving the second NAS message, the AMF stores the received SUPI(s) if the SUPI(s) is not concealed. If the SUCI(s) is received in the second NAS message identity response message then the AMF sends a third message to the UDM to de-conceal the SUCI(s).
5. Upon receiving the third NAS message, the UDM de-conceals the received SUCI(s) and sent the corresponding SUPI(s) to the AMF in a fourth message.

6. Upon receiving the fourth message, the AMF stores the received SUPI(s).

In another embodiment, the issues related to whether parameters are to be re-used or not when the NAS procedure is rejected for cause values #3, #6, #7, #11, #13, #73, #74, #75 is described as below:
1A. The UE (100) registered to a PLMN and has received at least one of the following parameters from the PLMN.
Parameter(s):
NSSAI inclusion mode(s);
MPS indicator;
MCS indicator;
operator-defined access category definitions; and
network-assigned UE radio capability IDs.
2A. During a subsequent NAS procedure (e.g., registration procedure or service request procedure or de-registration procedure), the UE (100) receives one of the following a 5GMM cause value in a NAS message (e.g., registration reject, service reject or deregistration message) from the network:
(#3 (Illegal UE);
6 (Illegal ME);
7 (5GS services not allowed);
11 (PLMN not allowed);
12 (Tracking area not allowed);
13 (Roaming not allowed in this tracking area);
73 (Serving network not authorized);
74 (Temporarily not authorized for this SNPN); and
75 (Permanently not authorized for this SNPN).
3A. Upon receiving the NAS message with one of the cause values in step 2, the UE (100) may not use the parameter(s) value in subsequent NAS or AS procedure. In one example, if the parameter is NSSAI inclusion mode then the UE (100) may not use the received NSSAI inclusion mode and may not send S-NSSAI(s) during the subsequent RRC establishment procedure (e.g., RRCconnectionsetupcomplete or RRCsetupcomplete). In one example, if the parameter is MPS indicator or MCS indicator then the UE (100) may not use access identity 1 or 2 respectively in subsequent AS or NAS procedure until 1VIPS indicator or MCS indicator is sent in the subsequent NAS procedure. In one example, if the parameter is network-assigned UE radio capability IDs, the UE (100) may not send the previously network-assigned UE radio capability ID for the radio capabilities supported by the UE (100). The AMF fetches the set of radio capabilities supported by the UE (100) during the NAS or the AS procedure (e.g., registration procedure) and assigns, a network assigned UE radio capability ID for the received radio capabilities. The UE (100) subsequently uses a corresponding the network assigned UE radio capability ID in the NAS or the AS procedure.
4A. The UE (100) may delete the parameter(s) from the non-volatile memory.

Figure 4:
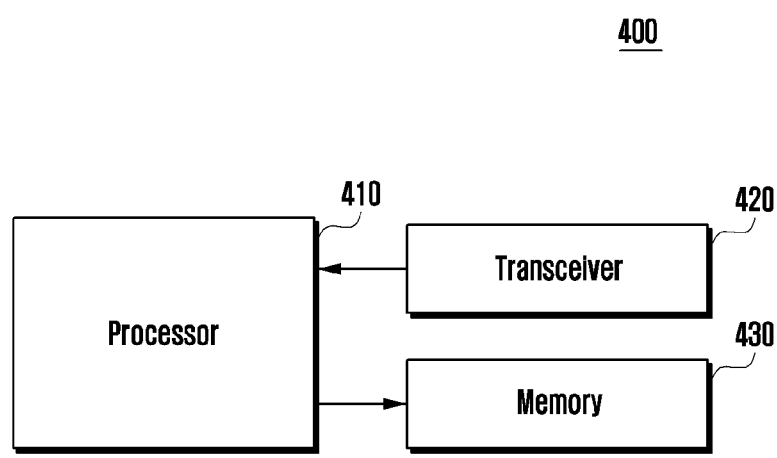
FIG. 4 illustrates a block diagram of a network entity according to embodiments of the present disclosure.

FIG. 4 illustrates a block diagram of a network entity according to embodiments of the present disclosure.

Referring to the FIG. 4, the network entity (400) may include a processor (410), a transceiver (420) and a memory (430). However, all of the illustrated components are not essential. The network entity (400) may be implemented by more or less components than those illustrated in FIG. 4. In addition, the processor (410) and the transceiver (420) and the memory (430) may be implemented as a single chip according to another embodiment.

Figure 5:
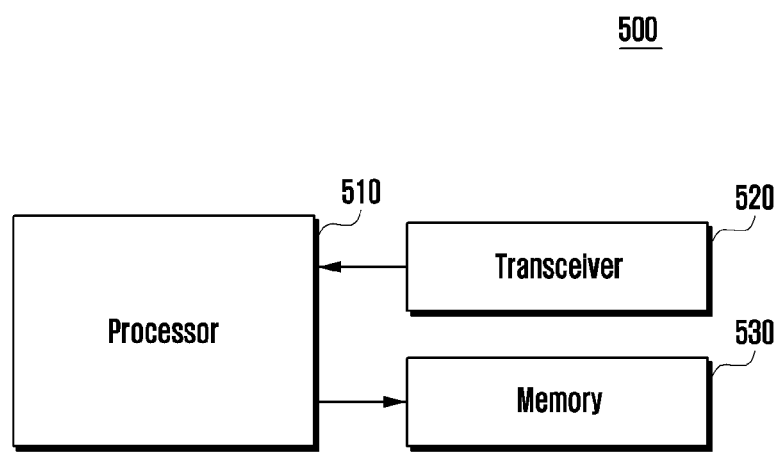
FIG. 5 illustrates a block diagram of a user equipment (UE) according to embodiments of the present disclosure.

FIG. 5 illustrates a terminal according to embodiments of the present disclosure.

Referring to the FIG. 5, the terminal (500) may include a processor or a controller (510), a transceiver (520) and a memory (530). However, all of the illustrated components are not essential. The terminal (500) may be implemented by more or less components than those illustrated in FIG. 5. In addition, the processor (510) and the transceiver (520) and the memory (530) may be implemented as a single chip according to another embodiment.

In the present disclosure, the terminal may be a user equipment (UE), a mobile station (MS), or a mobile equipment (ME) in a communication system.

In one embodiment, the processor (510) may perform a registration procedure on a first standalone non-public network (SNPN), select a second SNPN based on a predetermined condition, and transmit, to a network entity via the transceiver, a registration request message on the second SNPN for an initial registration, in case that the second SNPN differs from the first SNPN.

In one embodiment, a registration attempt counter is reset, in case that the second SNPN differs from the first SNPN.

In one embodiment, the network entity is an access and mobility management function (AMF).

In one embodiment, the registration request message on the second SNPN for the initial registration includes information on a type of the registration, and the information on the type of the registration indicates an initial registration, in case that the second SNPN differs from the first SNPN.

In one embodiment, the predetermined condition includes a case that the terminal has lost a coverage of the first SNPN and the terminal recovers from a lack of coverage.

In one embodiment, the second SNPN is selected based on an automatic SNPN selection mode procedure.

In one embodiment, the second SNPN is selected based on a manual SNPN selection mode procedure.

In one embodiment, the terminal is configured with a list of subscriber data, and the list of subscriber data includes an SNPN identity.

In one embodiment, the second SNPN is selected based on the list of subscriber data.

In one embodiment, the processor (510) may perform a de-registration procedure on the first SNPN, in case that the second SNPN differs from the first SNPN.

The following definitions applies to the all the above embodiments. In the aforementioned embodiments, NSI is network specific identifier.

Definitions: For the purposes of the present document, the terms and definitions given in TR 21.905 and the following apply. A term defined in the present document takes precedence over the definition of the same term, if any, in TR 21.905.

5GLAN Group: A set of UEs using private communication for 5G LAN-type service.

5G Access Network: An access network comprising a NG-RAN and/or non-3GPP AN connecting to a 5G core network.

5G Core Network: The core network specified in the present document. The core network connects to a 5G access network.

5G LAN-Type Service: A service over the 5G system offering private communication using IP and/or non-IP type communications.

5G LAN-Virtual Network: A virtual network over the 5G system capable of supporting 5G LAN-type service.

5G System: 3GPP system consisting of 5G access network (AN), 5G core network and UE.

Allowed NSSAI: NSSAI provided by the serving PLMN during e.g., a registration procedure, indicating the S-NSSAIs values the UE could use in the serving PLMN for the current registration Area.
Configured NSSAI: NSSAI provisioned in the UE applicable to one or more PLMNs.
SNPN enabled UE: A UE configured to use stand-alone non-public networks.
SNPN access mode: A UE operating in SNPN access mode only selects stand-alone non-public networks over Uu.
Stand-alone Non-Public Network: A non-public network not relying on network functions provided by a PLMN
Subscribed S-NSSAI: S-NSSAI based on subscriber information, which a UE is subscribed to use in a PLMN
CAG only UE: a UE which is indicate by the network to access the 5GS by a CAG cell.
CAG Cell: The CAG cell shall broadcast information such that only UEs supporting CAG are accessing the cell.
Non-CAG cell: cell of a public PLMN. Normal cell where the UE can access public PLMN service.
Allowed CAG list: An Allowed CAG list of a UE is a list of CAG Identifiers the UE is allowed to access.
Abbreviations: For the purposes of the present document, the abbreviations given in TR 21.905 and the following apply. An abbreviation defined in the present document takes precedence over the definition of the same abbreviation, if any, in TR 21.905.

5GC 5G Core Network
5GLAN 5G Local Area Network
5GS 5G System
5G-AN 5G Access Network
5G-EIR 5G-Equipment Identity Register
5G-GUTI 5G Globally Unique Temporary Identifier
5G-BRG 5G Broadband Residential Gateway
5G-CRG 5G Cable Residential Gateway
5G-RG 5G Residential Gateway
5G-S-TMSI 5G S-Temporary Mobile Subscription Identifier
5QI 5G QoS Identifier
AF Application Function
AMF Access and Mobility Management Function
AS Access Stratum
ATSSS Access Traffic Steering, Switching, Splitting
ATSSS-LL ATSSS Low-Layer
AUSF Authentication Server Function
BSF Binding Support Function
CAG Closed Access Group
CAPIF Common API Framework for 3GPP northbound APIs
CHF Charging Function
CN PDB Core Network Packet Delay Budget
CP Control Plane
DL Downlink
DN Data Network
DNAI DN Access Identifier
DNN Data Network Name
DRX Discontinuous Reception
DS-TT Device-side TSN translator
ePDG evolved Packet Data Gateway
EBI EPS Bearer Identity
FAR Forwarding Action Rule
FN-BRG Fixed Network Broadband RG
FN-CRG Fixed Network Cable RG
FN-RG Fixed Network RG
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
I-SMF Intermediate SMF
LADN Local Area Data Network
LBO Local Break Out (roaming)
LMF Location Management Function
LPP LTE Positioning Protocol
LRF Location Retrieval Function
MCX Mission Critical Service
MDBV Maximum Data Burst Volume
MFBR Maximum Flow Bit Rate
MICO Mobile Initiated Connection Only
MPS Multimedia Priority Service
MP TCP Multi-Path TCP Protocol
N3IWF Non-3 GPP Inter Working Function
NAI Network Access Identifier
NEF Network Exposure Function
NF Network Function
NGAP Next Generation Application Protocol
NID Network identifier
NPN Non-Public Network
NR New Radio
NRF Network Repository Function
NSI Network Specific Identifier
NSI ID Network Slice Instance Identifier
NSSAI Network Slice Selection Assistance Information
NSSF Network Slice Selection Function
NSSP Network Slice Selection Policy
NW-TT Network-side TSN translator
NWDAF Network Data Analytics Function
PCF Policy Control Function
PDR Packet Detection Rule
PDU Protocol Data Unit
PEI Permanent Equipment Identifier
PER Packet Error Rate
PFD Packet Flow Description
PPD Paging Policy Differentiation
PPF Paging Proceed Flag
PPI Paging Policy Indicator
PSA PDU Session Anchor
QFI QoS Flow Identifier
QoE Quality of Experience
RACS Radio Capabilities Signalling optimization.
(R)AN (Radio) Access Network
RG Residential Gateway
RQA Reflective QoS Attribute
RQI Reflective QoS Indication
RSN Redundancy Sequence Number
SA NR Standalone New Radio
SBA Service Based Architecture
SBI Service Based Interface
SCP Service Communication Proxy
SD Slice Differentiator
SEAF Security Anchor Functionality
SEPP Security Edge Protection Proxy
SMF Session Management Function
SMSF Short Message Service Function
SN Sequence Number
SNPN Stand-alone Non-Public Network
S-NSSAI Single Network Slice Selection Assistance Information
SSC Session and Service Continuity SSCMSP Session and Service Continuity Mode Selection Policy
SST Slice/Service Type
SUCI Subscription Concealed Identifier
SUPI Subscription Permanent Identifier
SV Software Version
TAC IMEI Type Allocation Code
TNAN Trusted Non-3GPP Access Network
TNAP Trusted Non-3GPP Access Point
TNGF Trusted Non-3GPP Gateway Function
TNL Transport Network Layer
TNLA Transport Network Layer Association
TSC Time Sensitive Communication
TSN Time Sensitive Networking
TSP Traffic Steering Policy
UCMF UE radio Capability Management Function
UDM Unified Data Management
UDR Unified Data Repository
UDSF Unstructured Data Storage Function
UL Uplink
UL CL Uplink Classifier
UPF User Plane Function
URLLC Ultra Reliable Low Latency Communication
URRP-AMF UE Reachability Request Parameter for AMF
URSP UE Route Selection Policy
VID VLAN Identifier
VLAN Virtual Local Area Network
W-5GAN Wireline 5G Access Network
W-5GBAN Wireline BBF Access Network
W-5GCAN Wireline 5G Cable Access Network
W-AGF Wireline Access Gateway Function The embodiments disclosed herein can be implemented through at least one software program running on at least one hardware device and performing network management functions to control the elements. The elements include blocks, elements, actions, acts, steps, or the like which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a mobile communication system, the method comprising:
    performing a standalone non-public network (SNPN) selection;
    identifying a new SNPN being selected based on the SNPN selection; and
    based on the identification, resetting a registration attempt counter and initiating a registration procedure for an initial registration,
    wherein the initiating of the registration procedure for the initial registration further comprises transmitting, to a network entity, a registration request message including information on a registration type, and
    wherein the information on the registration type indicates the initial registration.

2. The method of claim 1, wherein the network entity is an access and mobility management function (AMF).

3. The method of claim 1, wherein the terminal is configured with a list of subscriber data including an SNPN identity and the SNPN selection is performed based on the list of subscriber data.

4. The method of claim 1, wherein the SNPN selection is performed in case that the terminal recovers from a lack of coverage.

5. The method of claim 1, wherein the SNPN selection is performed using an automatic SNPN selection mode procedure.

6. The method of claim 1, wherein the SNPN selection is performed using a manual SNPN selection mode procedure.

7. A terminal in a mobile communication system, the terminal comprising:
    a transceiver; and
    a controller operably connected to the transceiver, the controller configured to:
        perform a standalone non-public network (SNPN) selection,
        identify a new SNPN being selected based on the SNPN selection, and
        based on the identification, reset a registration attempt counter and initiate a registration procedure for an initial registration by transmitting, to a network entity via the transceiver, a registration request message including information on a registration type,
    wherein the information on the registration type indicates the initial registration.

8. The terminal of claim 7, wherein the network entity is an access and mobility management function (AMF).

9. The terminal of claim 7, wherein the terminal is configured with a list of subscriber data including an SNPN identity and the SNPN selection is performed based on the list of subscriber data.

10. The terminal of claim 7, wherein the SNPN selection is performed in case that the terminal recovers from a lack of coverage.

11. The terminal of claim 7, wherein the SNPN selection is performed using an automatic SNPN selection mode procedure.

12. The terminal of claim 7, wherein the SNPN selection is performed using a manual SNPN selection mode procedure.

* * * * *

UNITED STATES PATENT AND TRADEMARK OFFICE
CERTIFICATE OF CORRECTION

PATENT NO. : 12,120,625 B2
APPLICATION NO. : 18/182205
DATED : October 15, 2024
INVENTOR(S) : Kundan Tiwari et al.

Page 1 of 1

It is certified that error appears in the above-identified patent and that said Letters Patent is hereby corrected as shown below:

On the Title Page

Foreign Application Priority Data, Item (30):
"Sep. 30, 2019  (IN).....................201941039545"
Should read:
--Sep. 30, 2019  (IN).....................201941039545
Jun. 22, 2020    (IN).....................201941039545--.

Signed and Sealed this
Twelfth Day of November, 2024

Katherine Kelly Vidal
*Director of the United States Patent and Trademark Office*